(12) United States Patent
Gutierrez et al.

(10) Patent No.: US 9,222,819 B2
(45) Date of Patent: Dec. 29, 2015

(54) TRACKING AND CONTROLLING FLUID DELIVERY FROM CHAMBER

(75) Inventors: Christian A. Gutierrez, Los Angeles, CA (US); Ellis Meng, Alhambra, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 712 days.

(21) Appl. No.: 13/487,000

(22) Filed: Jun. 1, 2012

(65) Prior Publication Data

US 2012/0234859 A1 Sep. 20, 2012

Related U.S. Application Data

(63) Continuation-in-part of application No. 13/202,882, filed as application No. PCT/US2010/025248 on Feb. 24, 2010, and a continuation-in-part of application No.

(Continued)

(51) Int. Cl.
*G01F 3/22* (2006.01)
*B67D 1/04* (2006.01)
(Continued)

(52) U.S. Cl.
CPC .............. *G01F 3/227* (2013.01); *B67D 1/0437* (2013.01); *B67D 1/0855* (2013.01); *G01F 3/20* (2013.01); *G01F 11/086* (2013.01); *G01M 3/16* (2013.01); *G01M 3/40* (2013.01)

(58) Field of Classification Search
CPC .. B67D 1/0437; B67D 1/0855; G01F 11/086; G01F 3/20; G01F 3/227; G01M 3/16; G01M 3/40
See application file for complete search history.

(56) References Cited

U.S. PATENT DOCUMENTS 2,497,906 A  2/1950  Peters, et al.
2,644,902 A  7/1953  Hardway, Jr.
(Continued)

FOREIGN PATENT DOCUMENTS

EP  1403519 A1  3/2004
GB  2456681 A  *  7/2009
(Continued)

OTHER PUBLICATIONS

Ateya, Daniel A., Ashish A. Shah, and Susan Z. Hua. "Impedance-based response of an electrolytic gas bubble to pressure in microfluidic channels."Sensors and Actuators A: Physical 122.2 (2005): 235-241.*

(Continued)

*Primary Examiner* — Lisa Caputo
*Assistant Examiner* — Punam Roy
(74) *Attorney, Agent, or Firm* — McDermott Will & Emery LLP

(57) ABSTRACT

Electrochemical impedance may be used for accurate and real-time tracking and control of fluid delivery from fluid-filled chambers, such as from drug delivery devices. At least two measurement electrodes may be placed within the chamber in contact with the fluid to be sensed. Application of a small alternating current using these electrodes through the fluid/drug may allow measurement of electrochemical impedance. Volumetric changes of the compressible chamber due to movement of at least one surface within the compressible chamber (such as an actuating bellows or flexible diaphragm), may induce changes in the measured electrochemical impedance. Measuring these changes may allow for tracking of ejected liquid volumes from the compressible chamber. By taking the time-derivative of this signal, the rate of volume change can be tracked and therefore the rate of ejected fluid (flow rate) can be deduced.

24 Claims, 7 Drawing Sheets

Related U.S. Application Data

12/709,335, filed on Feb. 19, 2010, now Pat. No. 8,579,885.

(60) Provisional application No. 61/492,678, filed on Jun. 2, 2011, provisional application No. 61/154,959, filed on Feb. 24, 2009, provisional application No. 61/246,891, filed on Sep. 29, 2009, provisional application No. 61/246,892, filed on Sep. 29, 2009, provisional application No. 61/154,327, filed on Feb. 20, 2009.

(51) Int. Cl.
    *B67D 1/08*     (2006.01)
    *G01F 3/20*     (2006.01)
    *G01F 11/08*     (2006.01)
    *G01M 3/16*     (2006.01)
    *G01M 3/40*     (2006.01)

(56) References Cited

U.S. PATENT DOCUMENTS

| | | |
|---|---|---|
| 4,601,545 A | 7/1986 | Kern |
| 4,699,615 A | 10/1987 | Fischell et al. |
| 4,712,583 A | 12/1987 | Pelmulder et al. |
| 4,919,167 A | 4/1990 | Manska |
| 4,946,448 A | 8/1990 | Richmond |
| 4,980,646 A | 12/1990 | Zemel |
| 5,025,829 A | 6/1991 | Edwards et al. |
| 5,090,963 A | 2/1992 | Gross et al. |
| 5,135,499 A | 8/1992 | Tafani et al. |
| 5,318,557 A | 6/1994 | Gross |
| 5,472,122 A | 12/1995 | Appleby |
| 5,660,205 A | 8/1997 | Epstein |
| 5,725,017 A | 3/1998 | Elsberry et al. |
| 5,771,935 A | 6/1998 | Myers |
| 5,775,671 A | 7/1998 | Cote, Sr. |
| 5,906,597 A | 5/1999 | McPhee |
| 6,079,449 A | 6/2000 | Gerber |
| 6,089,272 A | 7/2000 | Brand et al. |
| 6,090,139 A | 7/2000 | Lemelson |
| 6,450,972 B1 | 9/2002 | Knoll |
| 6,470,904 B1 | 10/2002 | Tai et al. |
| 6,960,192 B1 | 11/2005 | Flaherty |
| 7,254,008 B2 | 8/2007 | Xie et al. |
| 7,291,512 B2 | 11/2007 | Unger |
| 7,658,119 B2 | 2/2010 | Loeb et al. |
| 7,866,954 B2 | 1/2011 | Kim et al. |
| 7,887,508 B2 | 2/2011 | Meng et al. |
| 8,181,531 B2 | 5/2012 | Carlen et al. |
| 8,372,046 B2 | 2/2013 | Meng et al. |
| 8,486,278 B2 | 7/2013 | Pang et al. |
| 8,490,497 B2 | 7/2013 | Gutierrez et al. |
| 8,669,952 B2 | 3/2014 | Hashimura et al. |
| 2001/0025160 A1 | 9/2001 | Felix et al. |
| 2002/0187260 A1 | 12/2002 | Sheppard, Jr. et al. |
| 2003/0143316 A1 | 7/2003 | Eipel et al. |
| 2003/0146958 A1* | 8/2003 | Aruga et al. ............ 347/85 |
| 2003/0167035 A1 | 9/2003 | Flaherty |
| 2003/0229310 A1 | 12/2003 | Flaherty et al. |
| 2004/0054333 A1 | 3/2004 | Theeuwes et al. |
| 2004/0068224 A1 | 4/2004 | Couvillon, Jr. et al. |
| 2005/0013805 A1 | 1/2005 | Tavori |
| 2005/0017172 A1 | 1/2005 | Gianchandani et al. |
| 2005/0051489 A1 | 3/2005 | Tai et al. |
| 2005/0247558 A1* | 11/2005 | Anex et al. ............ 204/275.1 |
| 2006/0127439 A1 | 6/2006 | Mattes et al. |
| 2006/0275907 A1 | 12/2006 | Glocker |
| 2006/0282134 A1 | 12/2006 | Shapiro et al. |
| 2007/0103697 A1 | 5/2007 | Degertekin |
| 2007/0227267 A1 | 10/2007 | Loeb et al. |
| 2007/0240986 A1* | 10/2007 | Reymond et al. ........... 204/412 |
| 2007/0247173 A1 | 10/2007 | Tai et al. |
| 2007/0264130 A1 | 11/2007 | Mallett |
| 2008/0039792 A1 | 2/2008 | Meng et al. |
| 2008/0058632 A1 | 3/2008 | Tai et al. |
| 2008/0083617 A1 | 4/2008 | Simpson et al. |
| 2008/0086095 A1 | 4/2008 | Dikeman et al. |
| 2008/0171134 A1 | 7/2008 | Xie et al. |
| 2008/0230053 A1 | 9/2008 | Kraft et al. |
| 2008/0255500 A1 | 10/2008 | Kissinger et al. |
| 2009/0084685 A1 | 4/2009 | Tai et al. |
| 2009/0192493 A1 | 7/2009 | Meng et al. |
| 2010/0217209 A1 | 8/2010 | Meng et al. |
| 2010/0222769 A1 | 9/2010 | Meng et al. |
| 2010/0305550 A1 | 12/2010 | Meng et al. |
| 2011/0233066 A1 | 9/2011 | Gutierrez et al. |
| 2011/0303016 A1 | 12/2011 | Gutierrez et al. |
| 2012/0211095 A1 | 8/2012 | Peck et al. |
| 2012/0234859 A1 | 9/2012 | Gutierrez et al. |
| 2013/0183209 A1* | 7/2013 | Richter et al. ............ 422/403 |

FOREIGN PATENT DOCUMENTS

| | | |
|---|---|---|
| WO | 0166173 A1 | 9/2001 |
| WO | 2007/106557 A2 | 9/2007 |
| WO | 2010099210 A2 | 9/2010 |
| WO | 2010141118 A2 | 12/2010 |

OTHER PUBLICATIONS

Smith, P.Z. 2004. Valve Selection Handbook—Engineering Fundamentals for Selecting the Right Valve Design for Every Industrial Flow Application (5th Edition), Elsevier, pp. 1-5. Access online at ,http://app.knovel.com/hotlink/toc/id:kpVSHEFSR4/valve-selection-handbook> on May 14, 2014.

Wang, X.-Q. et al. 2000. A Normally Closed-In Channel Micro Check Valve, in 13th IEEE International Conference on MicroElectro Mechanical Systems, Japan (MEMS '00), pp. 68-73.

Non-Final Office Action, dated May 22, 2014, for U.S. Appl. No. 13/202,882, entitled "Flexible Polymer-Based Encapsulated-Fluid Devices," filed Aug. 23, 2011, Christian A. Gutierrez et al., inventors (published as US2011/0303016 A1, on Dec. 15, 2011).

Non-final Office Action, dated Oct. 3, 2013, for U.S. Appl. No. 13/202,882, entitled "Flexible Polymer-Based Encapsulated-Fluid Devices," filed Aug. 23, 2011, Christian A. Gutierrez et al., inventors (published as US2011/0303016 A1, on Dec. 15, 2011).

Wolgemuth, L. 2002. The Surface Modification Properties of Parylene for Medical Applications. Medical Device and Manufacturing, 2002, pp. 1-4.

Non-final Office Action, dated Apr. 13, 2012, for U.S. Appl. No. 12/709,188, entitled "Drug Delivery Device with In-Plane Bandpass Regulation Check Valve in Heat-Shrink Packaging," filed Feb. 19, 2010, Ellis Meng et al., inventors, issued Feb. 12, 2013 as U.S. Pat. No. 8,372,046 B2.

Non-final Office Action, dated Jun. 21, 2012 for U.S. Appl. No. 12/709,335, entitled "MEMS Electrochemical Bellows Actuator," filed Feb. 19, 2010, Ellis Meng et al., inventors, published Sep. 2, 2010 as U.S. 2010/0222769 A1.

Notice of Allowance, dated Oct. 15, 2012, for U.S. Appl. No. 12/709,188, entitled "Drug Delivery Device with In-Plane Bandpass Regulation Check Valve in Heat-Shrink Packaging,"filed Feb. 19, 2010, Ellis Meng et al., inventors, issued Feb. 12, 2013 as U.S. Pat. No. 8,372,046 B2.

Supplemental Notice of Allowability, dated Nov. 13, 2012, for U.S. Appl. No. 12/709,188, entitled "Drug Delivery Device with In-Plane Bandpass Regulation Check Valve in Heat-Shrink Packaging," filed Feb. 19, 2010, Ellis Meng et al., inventors, issued Feb. 12, 2013 as U.S. Pat. No. 8,732,046 B2.

Final Office Action, dated Mar. 6, 2013, for U.S. Appl. No. 12/709,335, entitled "MEMS Electrochemical Bellows Actuator," filed Feb. 19, 2010, Ellis Meng et al., inventors, published Sep. 2, 2010 as U.S. 2010/0222769 A1.

Ayliffe H.E. et al., 2003. An electric impedance based MEMS system flow sensor for ionic solutions. Measurement science and Technology, vol. 14, pp. 1321-1327.

Helsel, M. et al. 1988. An electric impedance based MEMS system flow sensor for ionic solutions. Sensors and Actuators, pp. 93-98.

Kenalaey, G.L. et al. 1989. Electrorheological Fluid Based Robotic Finger with Tactile Sensing. International Conference on Robotics and Automation, pp. 132-136.

(56) References Cited

OTHER PUBLICATIONS

Matsumoto S. et al. 2008. New methods for liquid encapsulation in polymer MEMS structures. Proc. IEEE MEMS Conference, pp. 415-418.

Voyles, R.M. et al. 1996. Design of a Modular Tactile Sensor and Actuator Based on an Electrorheological Gel. International Conference on Robotics and Automation, pp. 13-17.

Wang, Z. et al. 2008. Theoretical and Experimental Study of Annular-Plate Self-Sealing Structures. J. MEMS, 2008, vol. 17, pp. 185-192.

Wettels N. et al. 2008. Biomimetic tactile sensor array. Advanced robotics, vol. 22, pp. 829-849.

International Search Report and Written Opinion of the International Searching Authority, dated Oct. 27, 2010, for PCT Application No. PCT/US2010/025248, entitled "Flexible Polymer-Based Encapsulated Fluid Devices," filed Feb. 24, 2010, published Sep. 2, 2010 as WO 2010099210 A2.

International Search Report and Written Opinion, dated Oct. 8, 2012, for PCT Application PCT/US2012/040526, filed Jun. 1, 2012, entitled "Tracking and Controlling Fluid Delivery from Chamber" (PCT counterpart to instant application).

Final Office Action, dated Jan. 6, 2015, for U.S. Appl. No. 13/202,882, entitled "Flexible Polymer-Based Encapsulated-Fluid Devices," filed Aug. 23, 2011, Christian A. Gutierrez et al., inventors.

\* cited by examiner

TRACKING AND CONTROLLING FLUID DELIVERY FROM CHAMBER

CROSS-REFERENCE TO RELATED APPLICATIONS

This application is based upon and claims priority to U.S. provisional patent application 61/492,678, entitled "Method for Tracking Fluid Delivery in Reservoir-Based Pumps," filed Jun. 2, 2011.

This application is also a continuation-in-part application of U.S. patent application Ser. No. 13/202,882, entitled "Flexible Polymer-Based Encapsulated-Fluid Devices," filed Aug. 23, 2011, which is a U.S. National Phase Application of and claims priority to Patent Cooperation Treaty application PCT/US2010/025248, entitled "Flexible Polymer-Based Encapsulated-Fluid Devices," filed Feb. 24, 2010, which claims priority to U.S. provisional patent application 61/154,959, entitled "Flexible Parylene-Based Electro-Mechanical Interface Technology For Neural Prostheses," filed Feb. 24, 2009; U.S. provisional patent application 61/246,891 entitled "Automatic Liquid Encapsulation In Parylene Microchambers By Integrated Stiction Valves," filed Sep. 29, 2009; and U.S. provisional patent application 61/246,892, entitled "MEMS Force/Tactile Sensor Based On Transduction Of Encapsulated Liquid Within Parylene Microstructures," filed Sep. 29, 2009.

This application is also a continuation-in-part of U.S. patent application Ser. No. 12/709,335, entitled "MEMS Electrochemical Bellows Actuator," filed Feb. 19, 2010, which claims priority to U.S. provisional patent application 61/154,327, entitled "MEMS Electrochemical Bellows Actuator," filed Feb. 20, 2009.

The entire content of each of these applications is incorporated herein by reference.

BACKGROUND

1. Technical Field

This disclosure relates to fluid dosing devices, including drug delivery devices, such as an electrolytic MEMS drug delivery pump.

2. Description of Related Art

The controlled administration of drugs can increase drug therapy effectiveness significantly, such as by 60%. Patient-tailored regimens may also achieve optimum efficacy. However, many drug delivery devices are preset to deliver a drug at a constant rate. They may not be able to track, adjust, and/or confirm drug dosage. Drug infusion pump technologies may operate in an open loop configuration. Doses may be delivered following a preset program without confirmation of the actual dose volume that is delivered. Flow sensing technologies, such as thermal flow sensors, may not be adequate for some applications due to limitations in resolution, accuracy, and/or detection limits. Thermal flow methods may require heating of the sensed media which can denature proteins and other biological solutions.

SUMMARY

Electrochemical impedance may be used for accurate and real-time tracking of fluid delivery from fluid-filled containers, such as from drug delivery devices. There may be accurate, real-time detection of fluid delivered from the chamber at volumes less than about 100 mL. This may include detection of physiologically-relevant doses of drug from any chamber-based drug delivery device, thereby enabling closed-loop drug delivery.

Measurements of the electrochemical impedance may detect volume changes and flow rate. This method may be straightforward to implement and highly sensitive (detection of <500 nL volumes). At least two measurement electrodes may be placed within the compressible chamber in contact with the fluid to be sensed. Application of a small alternating current through the fluid/drug using these electrodes may allow measurement of electrochemical impedance. Volumetric changes of the compressible chamber due to movement of at least one surface within the compressible chamber (such as an actuating bellows or flexible diaphragm), may induce changes in the measured electrochemical impedance. Measuring these changes may allow for tracking of ejected liquid volumes from the compressible chamber. By taking the time-derivative of this signal, the rate of volume change can be tracked and therefore the rate of ejected fluid (flow rate) can be deduced. The method may be low cost and may be compatible with a wide variety of fluids and suitable for wireless and implantable applications due to low power operation (which may be in the nanowatt range).

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 2A illustrates fluid escaping the outlet while the compressible chamber is relatively full. FIG. 2B illustrates how the volume of the compressible chamber has decreased as a result of it being compressed and fluid escaping, creating a higher impedance between the electrodes.

DETAILED DESCRIPTION OF ILLUSTRATIVE EMBODIMENTS

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

Figure 1:
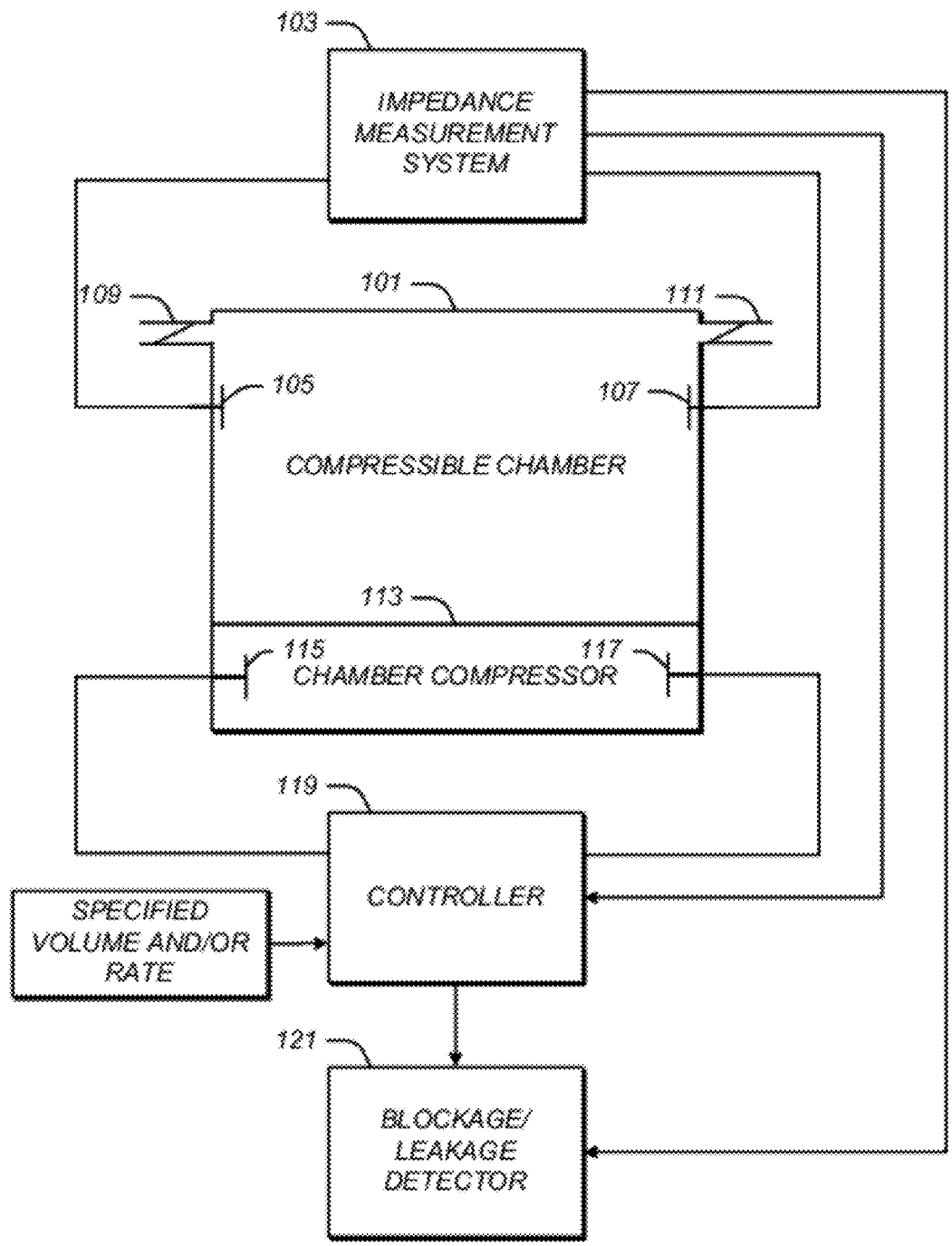
FIG. 1 illustrates an example of a fluid dosing device.

FIG. 1 illustrates an example of a fluid dosing device. As illustrated in FIG. 1, the fluid dosing device may include a compressible chamber 101, an inlet 109 to the compressible chamber 101, an outlet 111 from the compressible chamber 101, a chamber compressor 113, an impedance detection system that may include electrodes 105 and 107 and an impedance measurement system 103, a controller 119, and a blockage/leakage detector 121.

The compressible chamber 101 may be configured to contain a fluid, such as a drug. The inlet 109 may be used to fill the compressible chamber 101 with fluid, while the outlet 111 may be used to allow fluid to escape from the compressible chamber 101 when pressure is applied to fluid within the compressible chamber 101. The inlet 109 and outlet 111 may each include a valve or other means to prevent fluid from flowing in the opposite direction. The valve on the outlet 111 may also be configured to prevent fluid from leaking out of the compressible chamber 101 when the fluid is not placed under pressure.

The chamber compressor 113 may be configured to controllably apply pressure to fluid within the compressible chamber 101. The chamber compressor 113 may be located within the compressible chamber 101 and may be configured to controllably expand, thereby applying pressure to fluid within the compressible chamber 101. This may force fluid from the compressible chamber 101 through the outlet 111.

To facilitate this controllable expansion, the chamber compressor 113 may be configured to contain a fluid and may include electrodes 115 and 117 within the chamber compressor 113 that are configured to be in contact with the fluid. When a voltage is applied across the electrodes 115 and 117, this may cause electrical current to flow through the fluid within the chamber compressor 113, thereby causing electrolysis of the fluid within the chamber compressor 113 and, along with it, the generation of gas. In turn, the generated gas may cause the chamber compressor 113 to expand and, in turn, to apply pressure to fluid within the compressible chamber 101, thereby forcing fluid from the outlet 111. The amount of fluid that is forced from the outlet 111 may be equal in volume to the expansion in the volume of the chamber compressor 113 caused by the generation of gas within the chamber compressor 113.

As the volume of fluid within the compressible chamber 101 changes, the electrochemical impedance between the electrodes 105 and 107 may change. The impedance measurement system 103 may be configured to measure the impedance between the electrodes 105 and 107 and thus may detect changes in this impedance caused by changes in the volume of fluid within the compressible chamber 101. The impedance measurement system 103 may be configured to output information indicative of the volume of fluid that is delivered through the outlet 111 based on changes in the electrochemical impedance that it detects between the electrodes 105 and 107. The impedance measurement system 103 may also be configured to provide information indicative of the volume of fluid that enters the compressible chamber 101 through the inlet 109, again based on changes in the impedance of that fluid. The impedance measurement system 103 may be configured to output information indicative of the rate at which fluid is delivered through the outlet 111 based on the rate of change in the electrochemical impedance between the electrodes 105 and 107.

To facilitate these impedance measurements, the impedance measurement system 103 may be configured to deliver an AC signal to the electrodes 105 and 107. The AC signal may have a frequency of between 1 kHz and 50 kHz. The AC signal may have an amplitude that does not cause any appreciable amount of an irreversible chemical reaction in the fluid within the compressible chamber 101, such as an amplitude of between 10 mV and 1 V.

Although only two electrodes are illustrated as being within the compressible chamber 101 and the chamber compressor 113, a larger number of electrodes may be used instead. The wall of either chamber may in addition or instead function as one of their electrodes.

The controller 119 may be configured to cause the chamber compressor 113 to apply pressure to fluid within the compressible chamber 101. To facilitate this, the controller 119 may be configured to controllably deliver a current to the electrodes 115 and 117 within the chamber compressor 113.

The controller may be configured to cause the chamber compressor 113 to apply pressure to fluid within the compressible chamber 101 in a manner that causes a single dose of fluid that escapes through the outlet 111 to have a specified volume. To facilitate this, the controller 119 may be configured to receive information indicative of the specified volume and feedback from the impedance measurement system 103 indicative of the volume of fluid that escapes through the outlet 111. The controller 119 may be configured to stop current from being delivered to the electrodes 115 and 117 within the chamber compressor 113 when the information from the impedance measurement system 103 indicates that the specified volume of fluid has escaped through the outlet 111. A negative feedback loop may be employed to facilitate this control.

The controller may similarly be configured to cause the chamber compressor 113 to apply pressure to fluid within the compressible chamber 101 in a manner that causes a single dose of fluid to escape through the outlet 111 at a specified rate. To facilitate this, the controller 119 may be configured to receive information indicative of the specified rate and feedback from the impedance measurement system 103 indicative of the rate at which fluid escapes through the outlet 111. The controller 119 may be configured to regulate the magnitude of current that is delivered to the electrodes 115 and 117 within the chamber compressor 113 so that it causes the specified rate to be reflected by the rate information from the impedance measurement system 103. Again, a negative feedback look may be employed.

The blockage/leakage detector 121 may be configured to detect a blockage of fluid in the outlet 111 and/or a leakage of fluid from the outlet 111 based on information from the impedance measurement system 103 and the controller 119.

For example, the blockage/leakage detector 121 may be configured to detect a blockage of fluid in the outlet 111 when information from the controller 119 indicates that current is flowing through the electrodes 115 and 117 within the chamber compressor 113, while information from the impedance measurement system 103 indicates the absence of any material change in the impedance of fluid within the compressible chamber 101.

Similarly, the blockage/leakage detector 121 may be configured to detect leakage of fluid from the outlet 111 when information from the controller 119 indicates that no current is flowing through the electrodes 115 and 117 within the chamber compressor 113, while information from the impedance measurement system 113 indicates an increase in the impedance of fluid within the compressible chamber 101.

The blockage/leakage detector 121 may be configured to detect leakage of fluid from the chamber compressor 113 into the compressible chamber 101 when information from the controller 119 indicates that no current is flowing through the electrodes 115 and 117 within the chamber compressor 113, while information from the impedance measurement system 113 indicates a decrease in the impedance of fluid within the compressible chamber 101.

The impedance measurement system 103, the controller 119, and the blockage/leakage detector 121 may contain electronic circuitry configured to perform each of their respective functions, as described herein.

Real-time tracking and accurate monitoring of a wide range of drug dosage volumes may thus be accomplished by electrochemical impedance measurements. This may be implemented in connection with a fully integrated compressible chamber-based drug delivery system featuring electrolysis-based pumping. The chamber compressor 113 may operate by active or passive means. The liquid volume in the compressible chamber 101 may thus be measured and may be useful for determining chamber fullness in a refillable device.

Impedance measurements may be made within the compressible chamber 101. The compressible chamber 101 may contain at least one movable surface which compresses the fluid contained within the compressible chamber 101 and causes the fluid to be ejected through an outlet from the compressible chamber 101. Changes in impedance measured through the fluid within compressible chamber 101 may be produced by a resulting volume change of the fluid (in this case, a loss of fluid) following ejection. The compressible chamber 101 may instead not be compressible.

Figure 2A:
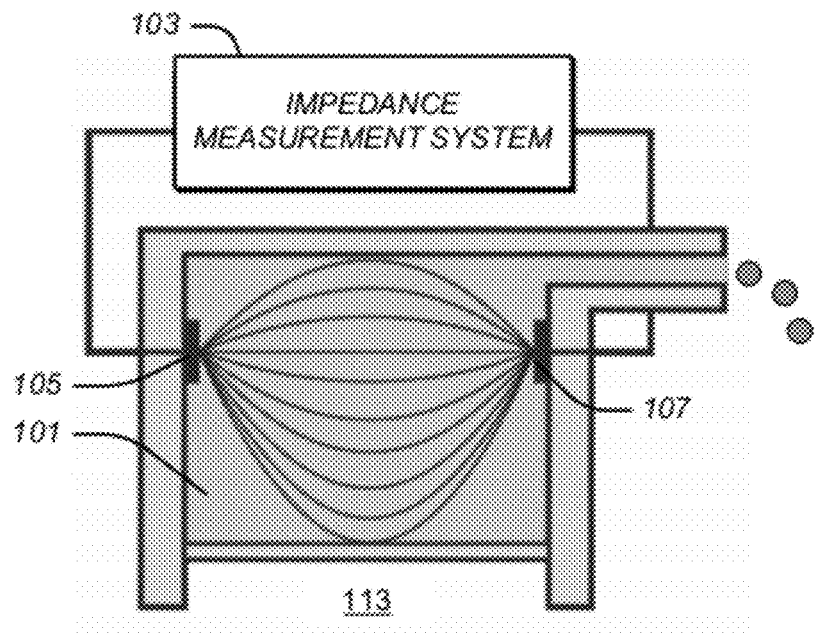
FIGS. 2A and 2B illustrate an example of changes in the size of the compressible chamber illustrated in FIG. 1 caused by fluid escaping the compressible chamber.
Figure 2B:
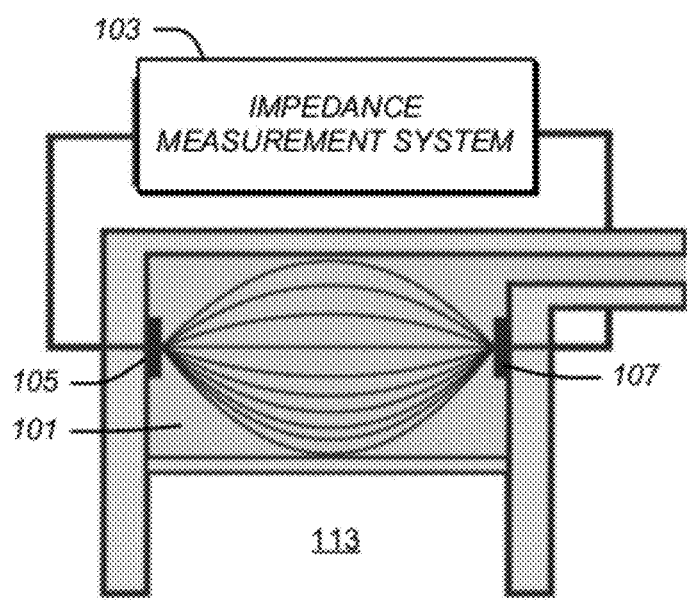

FIGS. 2A and 2B illustrate an example of changes in the size of the compressible chamber 101 illustrated in FIG. 1 caused by fluid escaping the compressible chamber 101. FIG. 2A illustrates fluid escaping the outlet 111 while the compressible chamber 101 is relatively full. FIG. 2B illustrates how the volume of the compressible chamber 101 has decreased as a result of it being compressed and fluid escaping, creating a higher impedance between the electrodes 105 and 107. An increase in volume as a result of filling may also be detected by changes in the electrochemical impedance measurements.

The electrodes 105 and 107 may be of any type. For example, they may be metal (e.g., platinum, gold, or silver), carbon, thick-film pastes (e.g., carbon, silver, carbon-nanotubes), or isolated wires. Noble metals may be used to reduce electrode decomposition within the solution due to redox reactions when potential is applied. These electrodes may be integrated into and exposed to the fluid within the compressible chamber 101. The compressible chamber 101 may contain a drug to be delivered, or it may contain another fluid (such as water acting as a source for electrolytic pressure generation). The electrochemical impedance of the solution surrounding the two immersed electrodes may be monitored by the impedance measurement system 103.

The electrode-electrolyte interface may be modeled by a Randles circuit which may consist of the solution (electrolyte) resistance in series with a parallel combination of a double layer capacitance and polarization resistance.

Measurement of electrochemical impedance may be accomplished by applying a low frequency AC voltage (e.g., in the 1-50 kHz) across the integrated electrodes 105 and 107. At such frequencies, the impedance response may be dominated by the solution resistance. The voltage selected may be low such that only reversible chemical reactions are present and the solution is not chemically modified during the measurement process.

The impedance measurement system 103 may use any technique to measure the electrochemical impedance. For example, it may include an external measurement instrument such as an LCR meter or an impedance/network analyzer. This measurement may consume very low power, such as only nW-µW (1-100 mV, 1-100 nA).

When the volume of the fluid in the compressible chamber 101 changes (for example, due to movement of at least one surface within the compressible chamber 101), the measured electrochemical impedance (or solution resistance) may also change, thus allowing for tracking of ejected fluid volumes from the compressible chamber 101. By taking the time-derivative of this signal, the rate at which the volume change occurs can be tracked and therefore the rate of ejected fluid (flow rate) can be measured and regulated.

Figure 3:
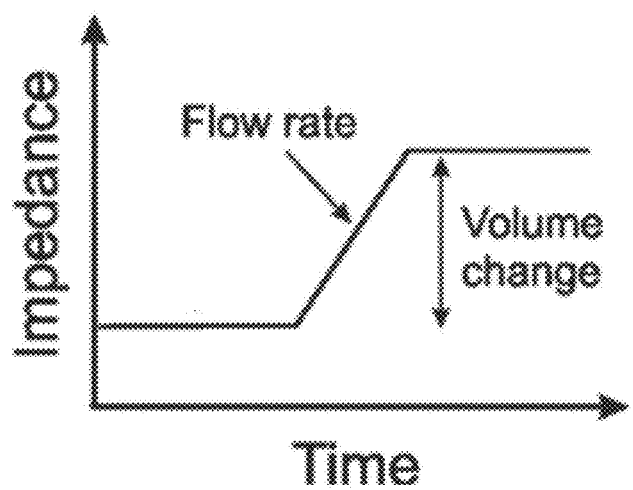
FIG. 3 is an example of a graph of the impedance changes illustrated in FIGS. 2A and 2B.

By implementing these measurements within an actively controlled drug delivery device, the dose and flow rate can be tracked and regulated in real-time. Closed-loop drug delivery operation can therefore be realized when the dosing system is mediated by dose and flow rate measurements acquired through the methods described above FIG. 3 is an example of a graph of the impedance changes illustrated in FIGS. 2A and 2B. As illustrated in FIG. 3, the impedance may remain constant when no fluid is flowing. As fluid exits the compressible chamber 101 through the outlet 111, the volume of fluid within the compressible chamber 101 may decrease, causing a corresponding increase in impedance, as also illustrated in FIG. 3. The difference in the pre-flow and post-flow impedances may be calculated by the impedance measurement system and used as an indication of the volume of fluid that has escaped from the outlet 111.

Figure 4:
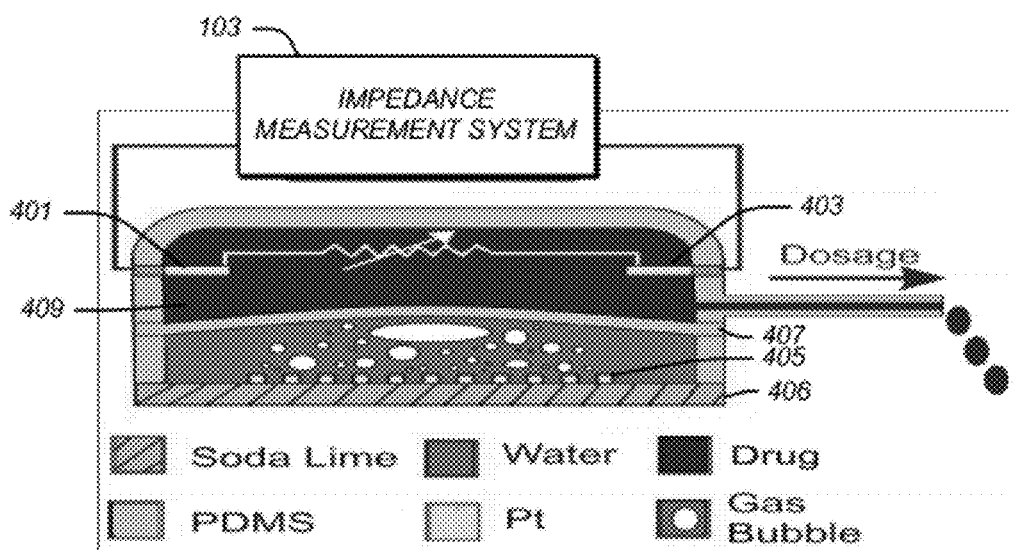
FIG. 4 illustrates an example of a portion of a fluid dosing device that uses electrolysis-based actuation in the chamber compressor illustrated in FIG. 1.

FIG. 4 illustrates an example of a portion of a fluid dosing device that uses electrolysis-based actuation in the chamber compressor 113 illustrated in FIG. 1. As illustrated in FIG. 4, impedance measurement microelectrodes 401 and 403 have been integrated into a MEMS electrochemical drug pump. The electrolysis pump electrodes were fabricated on a soda lime substrate by using standard microfabrication methods (liftoff) and potentiostatically cleaned at ±0.5 V in 1× phosphate buffered saline. The remaining parts were produced by replica casting of polydimethylsiloxane (PDMS) from conventionally machined acrylic master molds. Electrolysis electrodes 405 were adhered on the pump chamber base 406. A pump diaphragm 407 (e.g., 400 µm thick) and compressible chamber 409 were attached using PDMS prepolymer and cured in place.

The impedance measurement microelectrodes 401 and 403 were integrated into the compressible chamber 409 and formed from 30 AWG wire cured in place using PDMS. The compressible chamber 409 was filled with deionized (DI) water (serving as electrolyte and model drug, respectively).

Impedance measurements were acquired in real-time via a LabVIEW-interfaced precision LCR meter (1 Vpp, 5 kHz) connected to the impedance measurement microelectrodes 401 and 403. At this voltage level, no material chemical modification of the drug occurred due to completely reversible chemical processes. Electrolysis-based pump activation was modulated by varying DC current applied to the electrolysis electrodes 405.

Figure 5A:
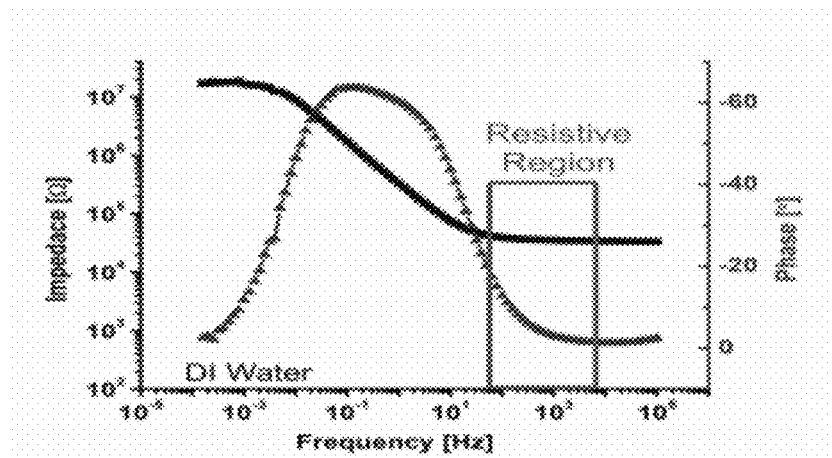
FIGS. 5A and 5B illustrate electrochemical impedance spectroscopy of fluid within the compressible chamber illustrated in FIG. 4.
Figure 5B:
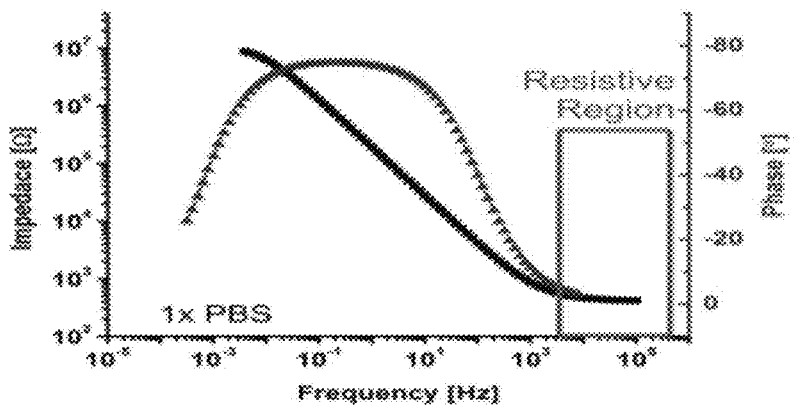

FIGS. 5A and 5B illustrate electrochemical impedance spectroscopy of fluid within the compressible chamber 409 illustrated in FIG. 4. with deionized water (FIG. 5A) and 1× phosphate buffered saline (FIG. 5B). This electrode impedance spectroscopy was performed to determine an optimum frequency at which solution resistance dominates the impedance response. For deionized water as a model drug (FIG. 5A), 1-5 kHz was found to be a suitably high frequency to bypass the double layer electrode capacitance, while avoiding parasitics encountered at higher frequencies. For 1× phosphate buffered saline (FIG. 5B), 10 kHz was chosen.

Figure 6:
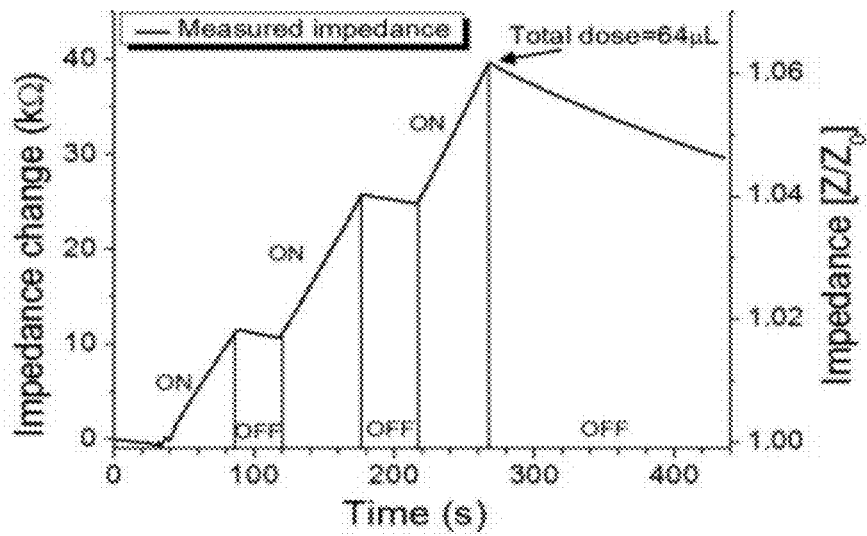
FIG. 6 illustrates detection of pump on and off states.

FIG. 6 illustrates detection of pump on and off states. 5 mA applied to the pump during the ON condition produced electrolytically-generated pressure causing diaphragm deflection into the compressible chamber 409, thus generating drug flow. No current was applied in the OFF state. Consecutive ON/OFF states were applied in 1 min/30 sec intervals, respectively, while impedance was continuously monitored. Pump ON/OFF states were readily detected; the ON state was reflected in a sustained increase in impedance magnitude. When turned OFF, a gradual decrease in the impedance magnitude was observed. This gradual decrease was a combined result of restorative elastic forces of the pump diaphragm and a recombination of gases that occurred in the OFF state. The result was a pullback effect that restored the compressible chamber to its resting volume and consequently reduced the measured impedance. A total dose of 64 µL (8% of compressible chamber 101) was delivered over a combined three minutes of pump activation (3 cycles of ON/OFF) and produced a corresponding impedance increase of 6% over the baseline value.

Figure 7:
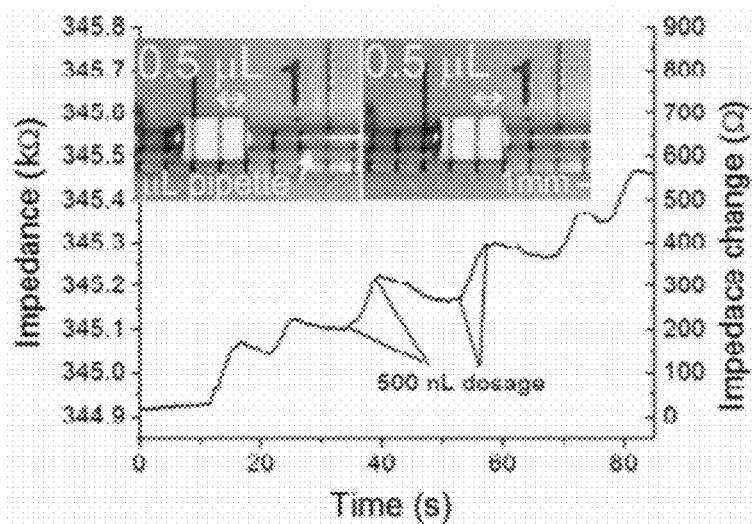
FIG. 7 illustrates detection of bolus delivery volume measured by a calibrated micropipette.

FIG. 7 illustrates detection of bolus delivery volume measured by a calibrated micropipette. Delivery of 500 nL boluses (0.625% of compressible chamber 409) was measured by impedance and confirmed using a calibrated micropipette (50 µL). Boluses were generated by applying 1.5 mA current pulses (3.4 seconds, as illustrated in FIG. 7). Corresponding impedance variations of approximately 150 ohms were observed per delivery bolus and provided a clear, robust impedance-based measurement. A sensitivity of 0.2 Ω/nL was obtained indicating the ability to track smaller volumes (detection limited by experimental setup, not the sensors). Further improvement in detection may be realized for pumps having rigid drug compressible chamber walls. Delivery of boluses as small as 230 nL was demonstrated using an electrolysis pump with rigid compressible chamber walls and a Parylene bellows, in place of the silicone rubber diaphragm.

Figure 8:
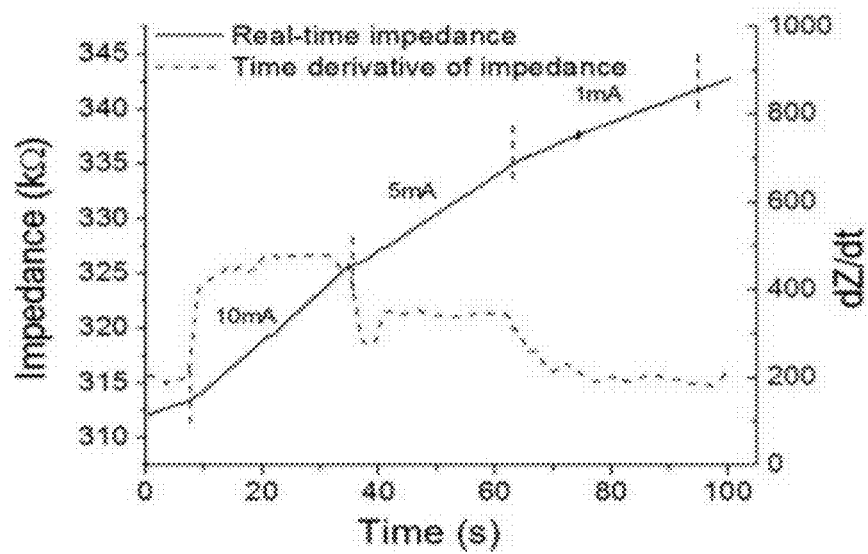
FIG. 8 illustrates the extraction of flow rates from impedance change measurements.

FIG. 8 illustrates the extraction of flow rates from impedance change measurements. Measurement of on-the-fly changes in delivery rate (and hence flow rate) was demonstrated. Flow rates (80, 44, and 2.78 µL/min) were measured for pump currents of 10, 5 and 1 mA, respectively, by taking the time-derivative of the impedance signal (3.4 µ/s per µL/min change in flow rate, as illustrated in FIG. 8).

Figure 9:
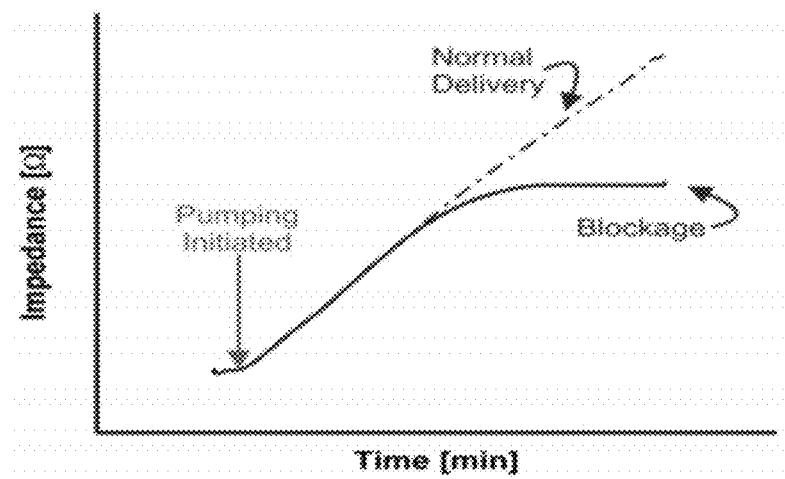
FIG. 9 illustrates a comparison of impedance measurements during normal delivery vs. during a blockage in the outlet.

FIG. 9 illustrates a comparison of impedance measurements during normal delivery vs. during a blockage in the outlet 111. If there is blockage in the outlet 111, fluid volume in the compressible chamber may not change, regardless of the compression. In this situation, the slope of the impedance read-out may level off, as illustrated in FIG. 9.

Figure 10:
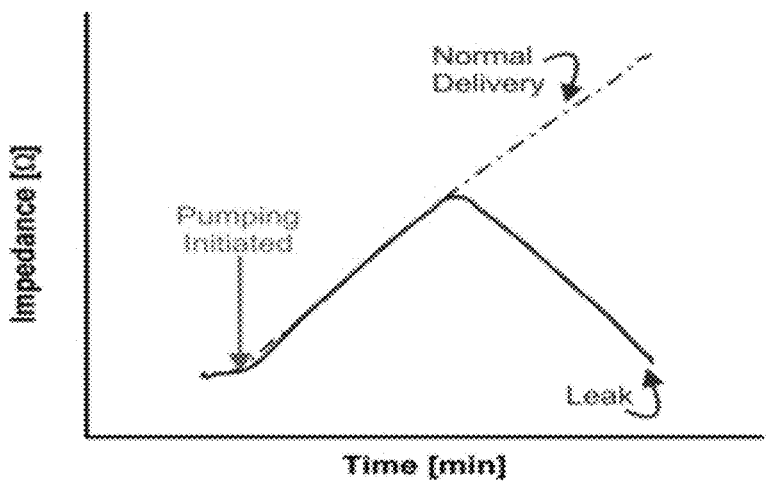
FIG. 10 illustrates a comparison of impedance measurements during normal delivery vs. leakage.

FIG. 10 illustrates a comparison of impedance measurements during normal delivery vs. during leakage. If fluid leaks from the chamber compressor to the compressible chamber, the slope of the impedance read-out may become negative.

Figure 11:
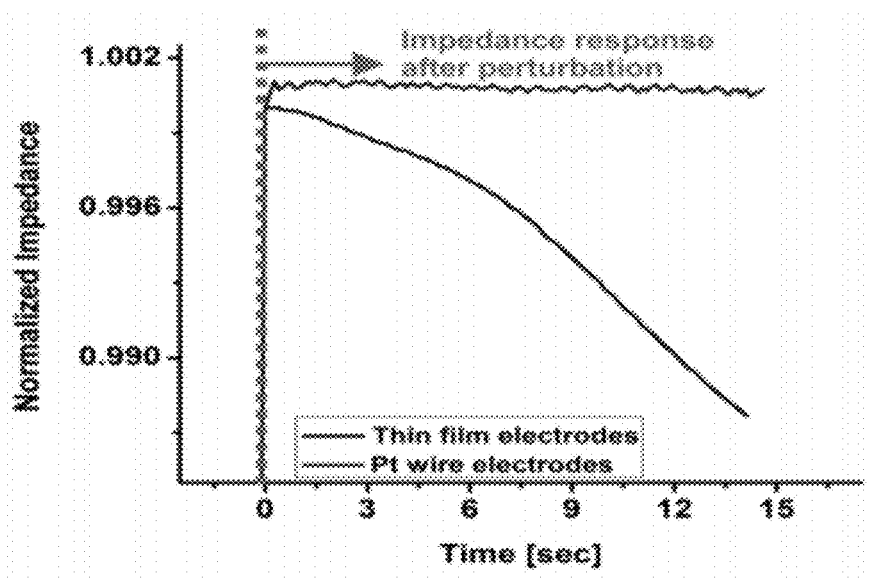
FIG. 11 illustrates a comparison of impedance signal drift from smooth thin-film platinum electrodes vs. platinum wire electrodes.

FIG. 11 illustrates a comparison of impedance signal drift from smooth thin-film platinum electrodes vs. platinum wire electrodes. Wire electrodes may exhibit reduced drift and result in more reliable impedance readings over time.

Closed-loop operation based on electrochemical impedance feedback can be realized in a complete system. Both delivered volume and flow rate can be measured and utilized as control parameters for calibrated, real-time adjustments to pump inputs, namely the magnitude of applied pump current. The controller 119 may be configured to perform these operations.

Features of what has been described include:

Use of electrochemical liquid impedance measurements as a transduction mechanism for measuring volume changes (losses and/or gains) of fluid within a container having at least one movable surface driven by a displacement actuator that may be powered electrically or by other means. Changes in the position of the movable surface may produce detectable changes in impedance.

Use of electrochemical liquid impedance measurements of volume change to calculate flow rate from the fluid container.

Integration of two or more sensing electrodes within a fluid container with at least one movable surface for purposes of electrochemical measurements of fluid volume change within or flow from the container—electrode placement may be optimized for sensing fluid volume change.

Inclusion of one or more paths for fluid exchange to the fluid container such that the container may be filled or emptied through the paths. The inlet and outlet paths may be the same or separate, and multiple paths may be used for either filling or emptying. The paths may be controlled by valves so that fluid does not enter/escape by diffusion, but only by deliberate filling or emptying.

Inclusion of fluid in contact with sensing electrodes.

Use electrochemical impedance measurements of fluid parameters such as volume change and flow rate resulting from fluid escaping from or filling into a fluid container for closed-loop feedback and control.

The components, steps, features, objects, benefits, and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases from a claim means that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A fluid dosing device for delivering one or more doses of fluid comprising:
   a chamber configured to contain fluid;
   a chamber compressor configured to controllably apply pressure to fluid within the chamber;
   an outlet from the chamber configured to allow fluid to escape from the chamber when pressure is applied to the fluid; and
   an impedance detection system configured to detect changes in the electrochemical impedance of fluid within the chamber caused by changes in the volume of the fluid caused by fluid escaping the chamber,
   wherein one or both of the following:
      the impedance detection system includes at least two physically-separated electrodes that do not move in response to fluid escaping the chamber; or
      the impedance detection system detects an increase in the electrochemical impedance of the fluid in response to fluid escaping the chamber.

2. The fluid dosing device of claim 1 wherein the impedance detection system includes at least two physically-separated electrodes configured to be in contact with fluid in the chamber and an impedance measurement system configured to measure the electrochemical impedance between the electrodes.

3. The fluid dosing device of claim 2 wherein the impedance measurement system is configured to output information indicative of the volume of fluid delivered through the outlet based on changes in the electrochemical impedance between the electrodes, as measured by the impedance measurement system.

4. The fluid dosing device of claim 3 further comprising a controller configured to cause the chamber compressor to apply pressure to fluid within the chamber in a manner that causes a single dose of fluid that escapes through the outlet to have a specified volume based on feedback to the controller from the impedance measurement system of the information indicative of the volume of fluid that is delivered through the outlet.

5. The fluid dosing device of claim 4 wherein the chamber, outlet, chamber compressor, and impedance detection system are configured to collectively permit the specified volume to be less than 100 mL.

6. The fluid dosing device of claim 5 wherein the chamber, outlet, chamber compressor, and impedance detection system are configured to collectively permit the specified volume to be greater than 1 nL.

7. The fluid dosing device of claim 2 wherein the impedance measurement system is configured to output information indicative of the rate at which fluid is delivered through the outlet based on the rate of change in the electrochemical impedance between the electrodes, as measured by the impedance measurement system.

8. The fluid dosing device of claim 7 further comprising a controller configured to cause the chamber compressor to apply pressure to fluid within the chamber in a manner that causes fluid to escape through the outlet at a specified rate based on feedback to the controller from the impedance measurement system of the information indicative of the rate of change in the electrochemical impedance between the electrodes.

9. The fluid dosing device of claim 8 wherein the chamber, outlet, chamber compressor, and impedance detection system are configured to collectively permit the specified rate to be less than 1 µL/min.

10. The fluid dosing device of claim 8 wherein the chamber, outlet, chamber compressor, and impedance detection system are configured to collectively permit the specified rate to be greater than 100 µL/min.

11. The fluid dosing device of claim 2 further comprising a blockage detector configured to output information indicative of a blockage in the outlet based on the absence of changes in the electrochemical impedance between the electrodes, as measured by the impedance measurement system, while the chamber compressor is controllably applying pressure to fluid within the chamber.

12. The fluid dosing device of claim 2 further comprising a leakage detector configured to output information indicative of leakage through the outlet based on changes in the electrochemical impedance between the electrodes, as measured by the impedance measurement system, in the absence of efforts by the chamber compressor to controllably apply pressure to fluid within the chamber.

13. The fluid dosing device of claim 2 further comprising a leakage detector configured to output information indicative of leakage from the chamber compressor to the compressible chamber based on changes in the electrochemical impedance between the electrodes, as measured by the impedance measurement system, in the absence of efforts by the chamber compressor to controllably apply pressure to fluid within the chamber.

14. The fluid dosing device of claim 2 wherein the impedance measurement system is configured to deliver an AC signal to the electrodes.

15. The fluid dosing device of claim 14 wherein the AC signal has a frequency of between 1 kHz and 50 kHz.

16. The fluid dosing device of claim 14 wherein the AC signal has an amplitude that does not cause any appreciable amount of irreversible chemical reaction in the fluid.

17. The fluid dosing device of claim 16 wherein the AC signal has a peak-to-peak amplitude of between 10 millivolts and 1 volt.

18. The fluid dosing device of claim 2 wherein the chamber, chamber compressor, outlet, and electrodes are configured to be implanted within a living organism.

19. The fluid dosing device of claim 18 wherein the second chamber is configured to contain a fluid and further comprising electrodes within the second chamber configured to be in contact with the fluid and to cause the fluid to undergo electrolysis when electricity passes through the electrodes.

20. The fluid dosing device of claim 1 wherein the chamber is a first chamber and wherein the chamber compressor includes a second chamber within the first chamber that is configured to controllably expand.

21. The fluid dosing device of claim 1 further comprising an inlet to the chamber configured to allow the chamber to be filed with fluid and wherein the impedance detection system is configured to detect changes in the electrochemical impedance of fluid within the chamber while fluid enters the chamber.

22. The fluid dosing device of claim 1 wherein the chamber is compressible and wherein the chamber compressor is configured to controllably compress the chamber.

23. The fluid dosing device of claim 1 wherein the impedance detection system detects an increase in the electrochemical impedance of the fluid in response to fluid escaping the chamber.

24. The fluid dosing device of claim 1 wherein the impedance detection system includes at least two physically-separated electrodes that do not move in response to fluid escaping the chamber.

* * * * *